(12) United States Patent
Lee et al.

(10) Patent No.: US 7,988,908 B2
(45) Date of Patent: Aug. 2, 2011

(54) FILLER METAL ALLOY COMPOSITIONS

(75) Inventors: Dong Ha Lee, Pyeongtaek-Si (KR); Jae Jung Park, Pyeongtaek-Si (KR); Chung Yun Kang, Geumjeong-gu (KR); Myoung Bok Kim, Geumjeong-gu (KR)

(73) Assignee: Korea Bundy Co., Ltd., Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 12/709,548

(22) Filed: Feb. 22, 2010

(65) Prior Publication Data

US 2011/0058980 A1    Mar. 10, 2011

(30) Foreign Application Priority Data

Sep. 8, 2009    (KR) .................. 10-2009-0084665

(51) Int. Cl.
*C22C 30/02* (2006.01)
*C22C 30/04* (2006.01)
*C22C 30/00* (2006.01)

(52) U.S. Cl. ............... 420/587; 420/589; 148/442

(58) Field of Classification Search ............ 420/587, 420/589; 148/442
See application file for complete search history.

(56) References Cited

FOREIGN PATENT DOCUMENTS

JP    05267299 A  *  10/1993

OTHER PUBLICATIONS

Fujii et al., English machine translation of JP 05-267299, Oct. 15, 1993, whole document.*

* cited by examiner

*Primary Examiner* — Roy King
*Assistant Examiner* — Caitlin Fogarty
(74) *Attorney, Agent, or Firm* — Sherr & Vaughn, PLLC

(57) ABSTRACT

Provided is a filler metal alloy composition capable of improving appearance of a welded zone and fluidity, penetration, etc., of an inexpensive filler metal by minimizing a content of silver (Ag) and adding tin (Sn) and silicon (Si) components. The filler metal alloy composition, brazed to a joint between parent metals to stably join the parent metals formed of the same material or different materials, is characterized in that the composition comprises silver (Ag), copper (Cu), zinc (Zn), tin (Sn), silicon (Si), and other unavoidable impurities.

2 Claims, 9 Drawing Sheets

210

230

FILLER METAL ALLOY COMPOSITIONS

CROSS REFERENCE TO PRIOR APPLICATIONS

This application claims priority to Korean Patent Application No. 10-2009-0084665 (filed on Sep. 8, 2009), which is hereby incorporated by reference in its entirety.

BACKGROUND OF THE INVENTION

1. Field of the Invention

The present invention relates to filler metal alloy compositions, and more particularly, to filler metal alloy compositions capable of improving appearance of a welded zone, and fluidity, penetration, etc., of an inexpensive filler metal by minimizing a content of silver (Ag) and adding tin (Sn) and silicon (Si) components.

2. Background of the Related Art

In general, welding is classified into fusion welding and soldering (or brazing) using a filler metal, and pressure welding without use of a filler metal.

Here, the fusion welding and the soldering are used to join parent metals by interposing a filler metal between the parent metals.

In addition, the fusion welding is a method of melting and joining welding zones of the parent metals and the filler metal, and the soldering is a method of melting only the filler metal and joining the parent metals, without melting welding zones of the parent metals. The soldering is based on a soft solder having a low melting point, and the brazing is based on a hard solder having a relatively high melting point.

Among filler metals used in the fusion welding, soldering and brazing, a silver solder is a typical precious filler metal, which has a lower joining temperature than other filler metals and a small heat-affected zone in the parent metal.

Further, since the silver solder has easy and good joining characteristics to various materials, the silver solder is widely used to join electronic devices, and large members such as industrial machines, and equipment.

Basic composition of such a silver solder is a ternary system of Ag—Cu—Zn, and alloys having Cd, Ni, Sn, In, Mn, or the like added thereto have been developed according to purposes such as workability, joining strength, corrosion resistance, and so on.

This silver solder is formed of, for example, a filler metal alloy composition of the Ag—Cu—Zn system used to braze coolant circulating pipes. The filler metal alloy composition of the Ag—Cu—Zn system used to braze coolant circulating pipes is added with In so as to be able to reduce a melting point of such a brazing alloy and increase fluidity thereof.

Specifically, the conventional filler metal alloy composition includes 30 to 40 wt % Ag, 34 to 38 wt % Cu, 33 wt % Zn, and 1.2 wt % In.

In particular, the conventional filler metal alloy composition including 30 wt % Ag, 35.8 wt % Cu, 33 wt % Zn, and 1.2 wt % In is widely used. Meanwhile, the filler metal alloy composition is applied to a welding rod for brazing coolant circulating pipes. Here, the coolant circulating pipe is a typical steel pipe coated with Al and Zn.

However, the Al—Zn coated steel materials provide bad joining characteristics to the welded zone when they are joined by the welding rod formed of the conventional filler metal alloy composition and when the same materials, i.e., the Al—Zn coated steel materials are joined with each other, due to characteristics of the materials.

Moreover, even when the Al—Zn coated steel material is joined not with the same material but with a different material, the Al—Zn coated steel material cannot provide good joining characteristics.

Therefore, when the Al—Zn coated steel pipes are joined by the brazing, a buffing process must be previously performed to grind the coated portion as a pre-treatment process.

Here, the buffing process is a process of grinding the surface of the Al—Zn coated steel pipe, which is performed until the surface of the coated steel pipe arrives at a state in which the joining can be properly achieved, through multiple buffing operations.

As described above, the conventional filler metal alloy composition is added with In to reduce a melting point of the brazing alloy and increase fluidity thereof, and Ag is added at 30 wt % or more.

However, a high content of expensive silver added to the conventional filler metal alloy composition may increase manufacturing cost thereof.

Moreover, when an expensive rare metal, In, is added, the manufacturing cost is further increased.

In addition, in the conventional filler metal alloy composition, since a temperature at which Zn is added is about a boiling point, Zn having a high vapor pressure may be vaporized.

Further, the vaporization of Zn may badly affect an operator's health, and a welding operation using a welding rod formed of the conventional filler metal alloy composition may badly affect the operator.

Furthermore, the operator may be badly affected while the welding is performed by the manufactured filler metal.

In addition, a large amount of oxides in a melt may cause slag during a process of manufacturing a conventional filler metal, and heating of filler metal billets to a high temperature during extrusion of the billets may cause severe oxidation scales, so that wastes are generated after the extrusion and the surface of the filler metal may be discolored after acid pickling.

SUMMARY OF THE INVENTION

In order to solve the above problems, the present invention provides filler metal alloy compositions capable of improving appearance of a welded zone and fluidity, penetration, etc., of an inexpensive filler metal by minimizing a content of silver (Ag) and adding tin (Sn) and silicon (Si) components.

In accordance with an aspect of the present invention, the above and other objects can be accomplished by providing a filler metal alloy composition brazed to a joint between parent metals to stably join the parent metals formed of the same material or different materials, characterized in that the composition comprises silver (Ag), copper (Cu), zinc (Zn), tin (Sn), silicon (Si), and other unavoidable impurities.

Here, the filler metal alloy composition may include 20 to 24 wt % Ag, 36 to 45 wt % Cu, 29 to 37 wt % Zn, 1 to 3 wt % Sn, 0.1 to 0.4 wt % Si, and other unavoidable impurities.

In addition, the filler metal alloy composition may include 22 wt % Ag, 41 to 45 wt % Cu, 30 to 32 wt % Zn, 2 wt % Sn, 0.2 wt % Si, and other unavoidable impurities.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
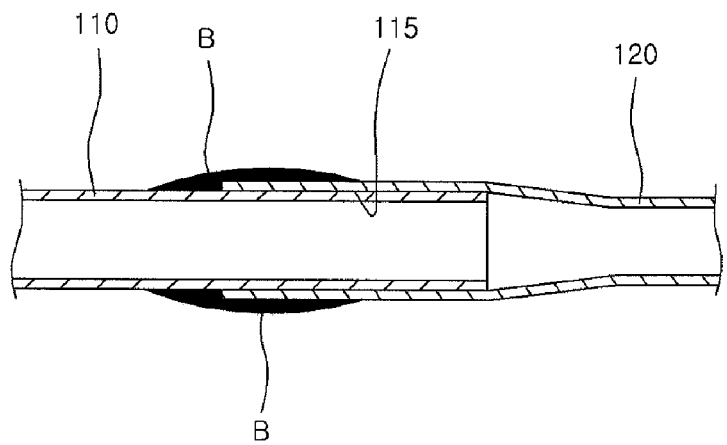
FIG. 1 is a view showing coolant circulating pipes welded by a welding rod for brazing formed of a filler metal alloy composition in accordance with the present invention.

Exemplary embodiments of the present invention will be described below with reference to the accompanying drawings. Like reference numerals designate like elements throughout the invention, additional descriptions of which will be omitted.

Hereinafter, a heat exchanger in accordance with an exemplary embodiment of the present invention will be described with reference to the accompanying drawings.

FIG. 1 is a view showing coolant circulating pipes welded by a welding rod for brazing formed of a filler metal alloy composition in accordance with the present invention.

First, referring to FIG. 1, the coolant circulating pipes welded by the welding rod for brazing formed of the filler metal alloy composition in accordance with the present invention will be described as follows.

As shown in FIG. 1, for a joint of the coolant circulating pipe, one end of a straight pipe 110 is inserted into an enlarged end of an enlarged pipe to a predetermined length.

Here, the enlarged pipe 120 is formed by enlarging outward from one end thereof fitted onto the outer surface of the straight pipe 110 to a predetermined depth.

As described above, the straight pipe 110 is inserted into the enlarged end of the enlarged pipe 120 and a filler metal alloy composition is intruded into an adhesion part 115 between the outer surface of the straight pipe 110 and the inner surface of the enlarged pipe 120 by brazing so that the pipes 110 and 120 can be stably connected to each other. In addition, a welding zone B may be formed to be welded to substantially surround the outer surfaces of the straight pipe 110 and the enlarged pipe 120 in both longitudinal directions with reference to the adhesion part 115.

Here, when the welding rod formed of the filler metal alloy composition is used, the Ag—Cu—Zn based filler metal alloy composition for brazing coolant circulating pipes provides permeability important to permeation into the adhesion part 115 and fluidity and wettability of the filler metal alloy composition. As described above, the filler metal alloy composition in accordance with the present invention is the Ag—Cu—Zn based filler metal alloy composition for coolant circulating pipe brazing, which has been manufactured and used for a welding rod for brazing.

That is, the filler metal alloy composition in accordance with the present invention is applied to the Ag—Cu—Zn based filler metal alloy composition for brazing coolant circulating pipes, which will be described as follows.

Of course, the filler metal alloy composition in accordance with the present invention may be variously applied and used not only for the coolant circulating pipe brazing but also for brazing techniques similar to the coolant circulating pipe brazing.

Figure 2:
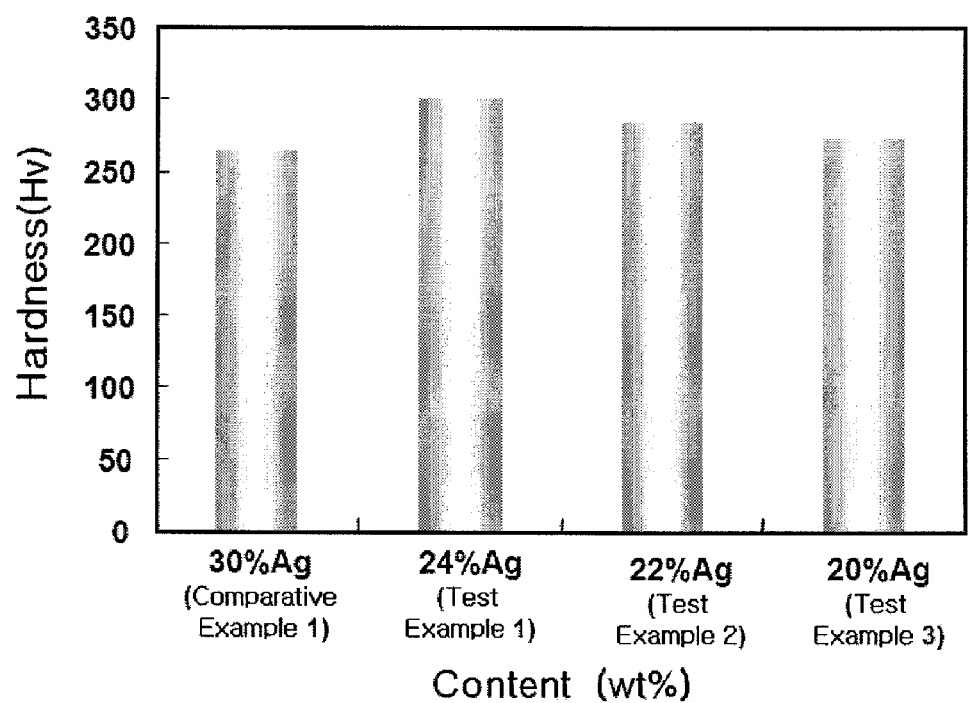
FIG. 2 is a graph showing a test example of a Ag—Cu—Zn based filler metal alloy composition for a coolant circulating pipe in accordance with the present invention, in which hardness of a filler metal alloy composition having a reduced Ag content and a conventional filler metal alloy composition having 30 wt % Ag is measured.

FIG. 2 is a graph showing a test example of a Ag—Cu—Zn based filler metal alloy composition for a coolant circulating pipe in accordance with the present invention, in which hardness of a filler metal alloy composition having a reduced Ag content and a conventional filler metal alloy composition having 30 wt % Ag is measured.

Figure 3:
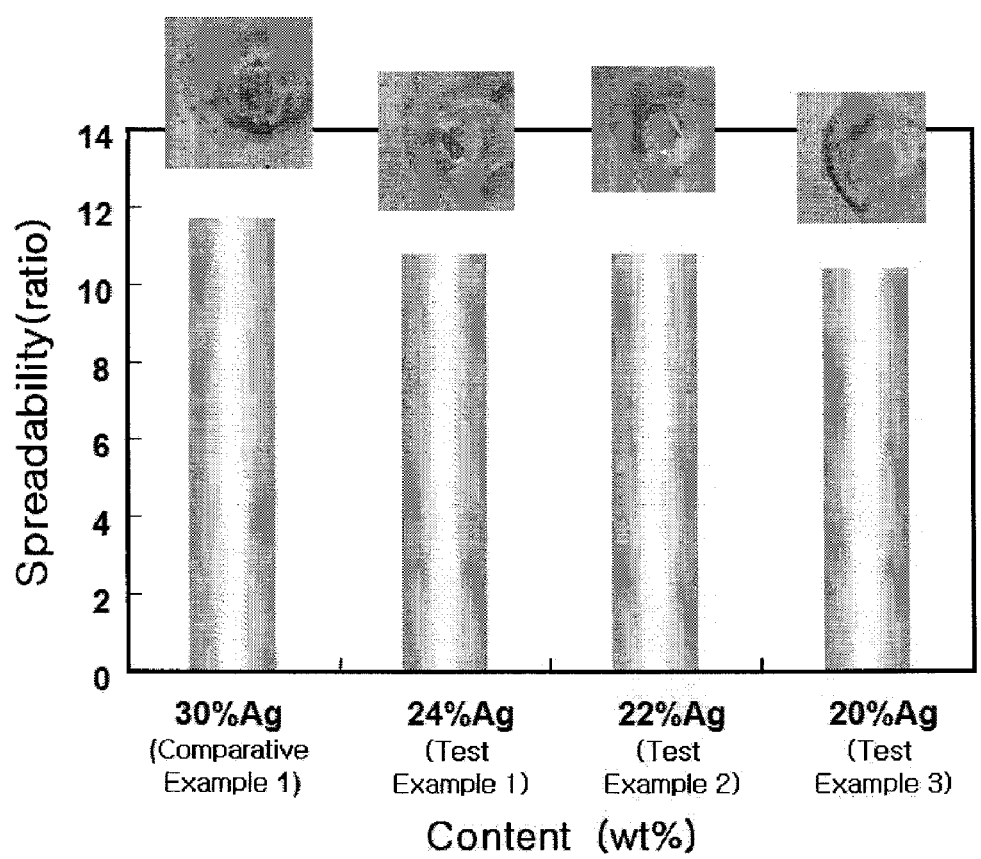
FIG. 3 is a graph showing a test example of a Ag—Cu—Zn based filler metal alloy composition for a coolant circulating pipe in accordance with the present invention, in which spreadability of a filler metal alloy composition having a reduced Ag content and a conventional filler metal alloy composition having 30 wt % Ag is measured.

FIG. 3 is a graph showing a test example of a Ag—Cu—Zn based filler metal alloy composition for a coolant circulating pipe in accordance with the present invention, in which spreadability of a filler metal alloy composition having a reduced Ag content and a conventional filler metal alloy composition having 30 wt % Ag is measured.

As shown in FIGS. 2 and 3, the filler metal alloy compositions include 24 wt % Ag (Test Example 1), 22 wt % Ag (Test Example 2), and 20 wt % Ag (Test Example 3). In addition to Ag, the filler metal alloy compositions measured for hardness include 38 wt % Cu and 38 wt % Zn, 40 wt % Cu and 38 wt % Zn, and 41 wt % Cu and 39 wt % Zn, respectively.

In addition, the conventional filler metal alloy composition including 30 wt % Ag (Comparative Example 1), hardness of which is to be measured, further includes 35.8 wt % Cu, 33 wt % Zn, and 1.2 wt % In.

Here, referring to FIG. 2, it will be appreciated that the Ag—Cu—Zn based filler metal alloy compositions for coolant circulating pipe brazing in accordance with the present invention having reduced Ag contents, for example, 24 wt % Ag (Test Example 1), 22 wt % Ag (Test Example 2), and 20 wt % Ag (Test Example 3) have greater hardness than the conventional filler metal alloy composition including 30 wt % Ag (Comparative Example 1).

In particular, it will be appreciated that the filler metal alloy composition having 25 wt % Ag (Test Example 1) has remarkably greater hardness than the conventional filler metal alloy composition including 30 wt % Ag.

Therefore, it will be appreciated that the filler metal alloy composition having a reduced Ag content can be applied to the Ag—Cu—Zn based filler metal alloy composition for coolant circulating pipe brazing. Meanwhile, referring to FIG. 3, it will be appreciated that the Ag—Cu—Zn based filler metal alloy compositions for coolant circulating pipe brazing in accordance with the present invention having reduced Ag contents, for example, 24 wt % Ag (Test Example 1), 22 wt % Ag (Test Example 2), and 20 wt % Ag (Test Example 3) have greater spreadability than the conventional filler metal alloy composition including 30 wt % Ag (Comparative Example 1).

However, since spreadability values have relatively slight differences, it will be appreciated that the filler metal alloy composition having a reduced Ag content can be applied to the Ag—Cu—Zn based filler metal alloy composition for coolant circulating pipe brazing by adjusting composition other than Ag or by adding a novel component.

Figure 4:
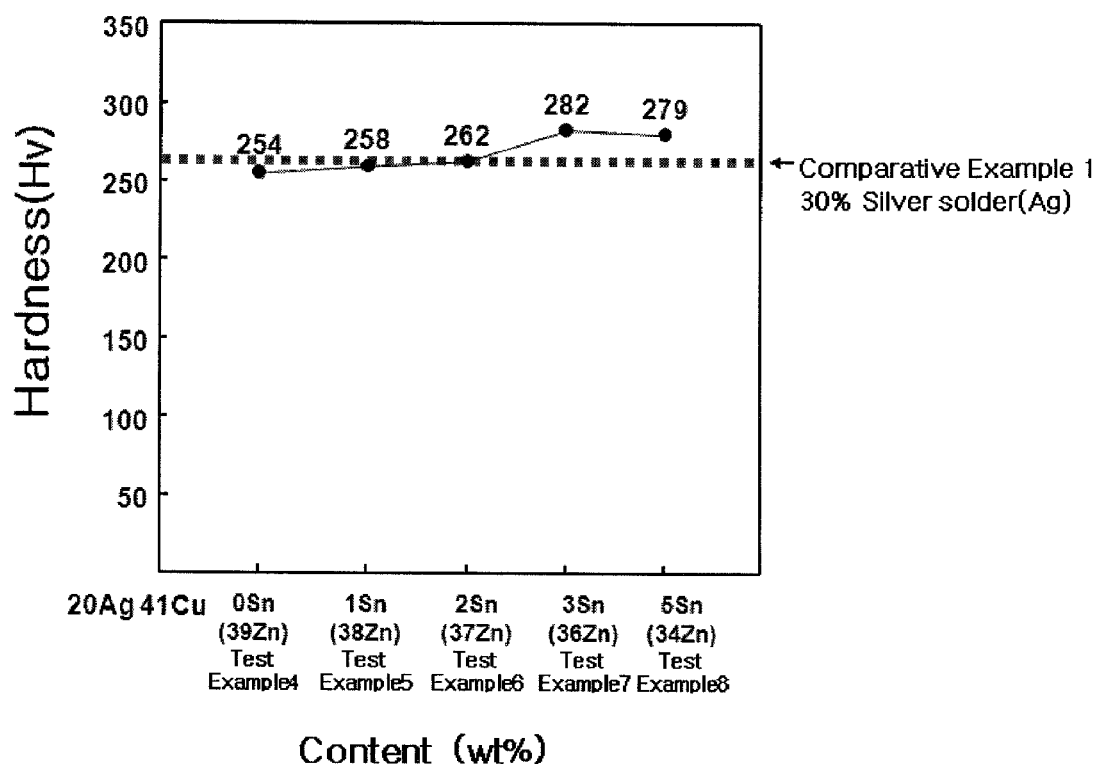
FIG. 4 is a graph showing a test example of a Ag—Cu—Zn based filler metal alloy composition for a coolant circulating pipe in accordance with the present invention, in which hardness of the composition at different Sn contents is measured.
Figure 5:
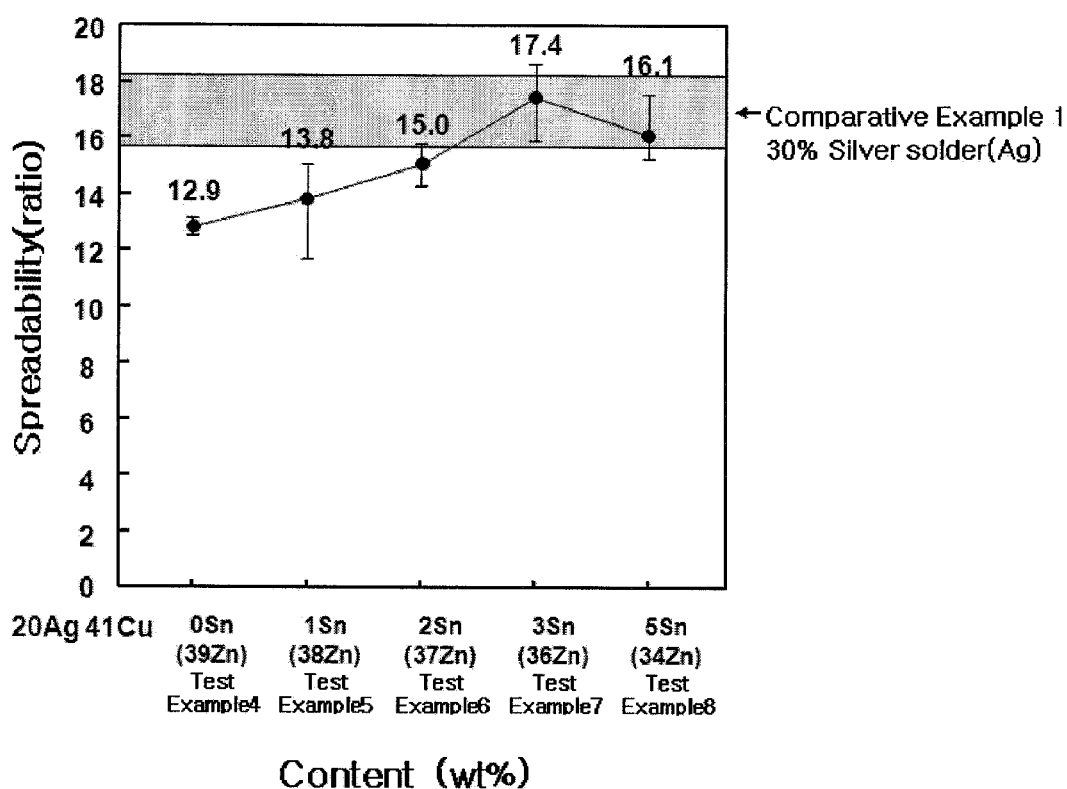
FIG. 5 is a graph showing a test example of a Ag—Cu—Zn based filler metal alloy composition for a coolant circulating pipe in accordance with the present invention, in which spreadability of the composition at different Sn contents is measured.

FIG. 4 is a graph showing a test example of a Ag—Cu—Zn based filler metal alloy composition for a coolant circulating pipe in accordance with the present invention, in which hardness of the composition at different Sn contents is measured, and FIG. 5 is a graph showing a test example of a Ag—Cu—Zn based filler metal alloy composition for a coolant circulating pipe in accordance with the present invention, in which spreadability of the composition at different Sn contents is measured.

As a result, referring to FIGS. 4 and 5 and Table 1, it will be appreciated that there is a slight difference in hardness between the filler metal alloy composition (Test Example 4) including 20 wt % Ag, 41 wt % Cu, 39 wt % Zn, and 0 wt % Sn as a test example of the Ag—Cu—Zn based filler metal alloy compositions for coolant circulating pipe brazing in accordance with the present invention and the conventional filler metal alloy composition (Comparative Example 1) including 30 wt % Ag.

In addition, it will be appreciated that there is a very slight difference in hardness between the filler metal alloy composition (Test Example 5) including 20 wt % Ag, 41 wt % Cu, 38 wt % Zn, and 1 wt % Sn as a test example of the Ag—Cu—Zn based filler metal alloy compositions for coolant circulating pipe brazing in accordance with the present invention and the conventional filler metal alloy composition (Comparative Example 1) including 30 wt % Ag.

Further, it will be appreciated that the filler metal alloy composition (Test Example 6) including 20 wt % Ag, 41 wt % Cu, 37 wt % Zn, and 2 wt % Sn as a test example of the Ag—Cu—Zn based filler metal alloy compositions for coolant circulating pipe brazing in accordance with the present invention and the conventional filler metal alloy composition (Comparative Example 1) including 30 wt % Ag have substantially the same hardness value.

Furthermore, it will be appreciated that the filler metal alloy composition (Test Example 7) including 20 wt % Ag, 41 wt % Cu, 36 wt % Zn, and 3 wt % Sn as a test example of the Ag—Cu—Zn based filler metal alloy compositions for coolant circulating pipe brazing in accordance with the present invention has a relatively larger hardness value than the conventional filler metal alloy composition (Comparative Example 1) including 30 wt % Ag.

Finally, similar to Test Example 7, it will be appreciated that the filler metal alloy composition (Test Example 8) including 20 wt % Ag, 41 wt % Cu, 34 wt % Zn, and 5 wt % Sn as a test example of the Ag—Cu—Zn based filler metal alloy compositions for coolant circulating pipe brazing in accordance with the present invention has a relatively larger

TABLE 1

| | Composition | Ag (wt %) | Cu (wt %) | Zn (wt %) | Sn (wt %) | Note (wt %) |
|---|---|---|---|---|---|---|
| Test Example 4 | Ag—Cu—Zn | 20 | 41 | 39 | | 20Ag0Sn |
| Test Example 5 | Ag—Cu—Zn—Sn | 20 | 41 | 38 | 1 | 20Ag1Sn |
| Test Example 6 | | 20 | 41 | 37 | 2 | 20Ag2Sn |
| Test Example 7 | | 20 | 41 | 36 | 3 | 20Ag3Sn |
| Test Example 8 | | 20 | 41 | 34 | 5 | 20Ag5Sn |
| | | | | | In (wt %) | |
| C. Example 1* | Ag—Cu—Zn—In | 30 | 35.8 | 33 | 1.2 | 30Ag1.2In |

*Comparative. Example 1

Table 1 shows Test Examples 4 to 8 of the Ag—Cu—Zn based filler metal alloy compositions for coolant circulating pipe brazing according to composition added to a ternary system of a Ag—Cu—Zn alloy in accordance with the present invention and Comparative Example 1 of the conventional filler metal alloy composition.

Here, Comparative Example 1 shows hardness measured with respect to the filler metal alloy composition including 35.8 wt % Cu, 33 wt % Zn, and 1.2 wt % In, in addition to the conventional filler metal alloy composition having 30 wt % Ag, and hardness and spreadability of the filler metal alloy composition of Test Examples 4 to 8 were measured with reference to Comparative Example 1.

hardness value than the conventional filler metal alloy composition (Comparative Example 1) including 30 wt % Ag.

As described above, it will be appreciated that Test Examples 4 to 8 of the Ag—Cu—Zn based filler metal alloy compositions for coolant circulating pipe brazing in accordance with the present invention have hardness values that increase depending on contents of Sn.

Of course, as shown in FIG. 4, it will be appreciated that, while Test Example 8 has a hardness value relatively smaller than that of Test Example 7, the difference is very slight. Finally, it will be appreciated that hardness increases as content of Sn is increased, and thus, Sn must be added to the Ag—Cu—Zn based filler metal alloy compositions for coolant circulating pipe brazing in accordance with the present invention.

Meanwhile, referring to FIG. 5 and Table 1, it will be appreciated that Test Examples 4 to 8 of the Ag—Cu—Zn based filler metal alloy compositions for coolant circulating pipe brazing in accordance with the present invention have spreadability values that increase depending on contents of Sn.

Of course, as shown in FIG. 5, it will be appreciated that Test Example 8 has a spreadability value remarkably smaller than that of Test Example 7, and thus, Sn must be added to the Ag—Cu—Zn based filler metal alloy compositions for coolant circulating pipe brazing in accordance with the present invention. Here, an additional amount of Sn must be adjusted, and a reference of the additional amount of Sn can be obtained.

By adding Sn having a very low melting point, it is possible to decrease a melting point of an alloy, and thus, improve fluidity, wettability, permeability, etc., of the alloy composition.

Moreover, since Sn is inexpensive in comparison with In and provides change in alloy composition approximate to the change in composition due to addition of In, it is possible to remarkably reduce manufacturing cost of the filler metal alloy composition.

Figure 6:
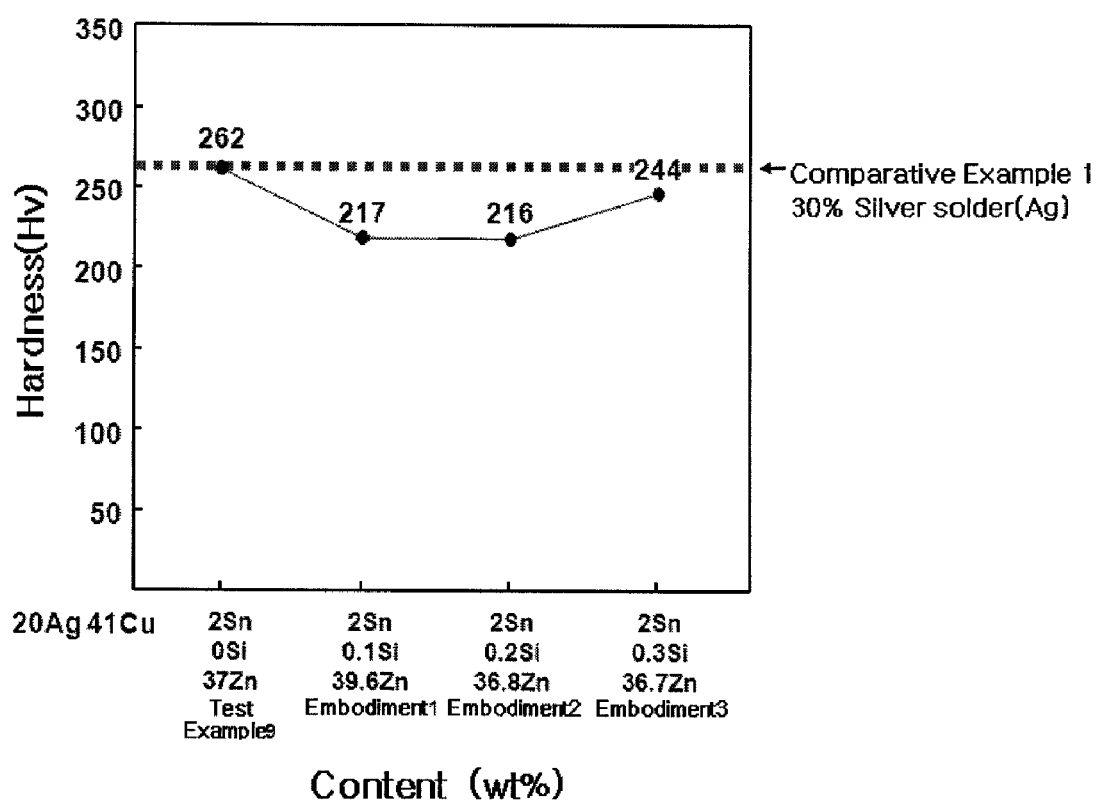
FIG. 6 is a graph showing a test example of a Ag—Cu—Zn based filler metal alloy composition for a coolant circulating pipe in accordance with first to third embodiments of the present invention, in which hardness of the composition at different Si contents is measured.

FIG. 6 is a graph showing a test example of a Ag—Cu—Zn based filler metal alloy composition for a coolant circulating pipe in accordance with first to third embodiments of the present invention, in which hardness of the composition at different Si contents is measured.

Figure 7:
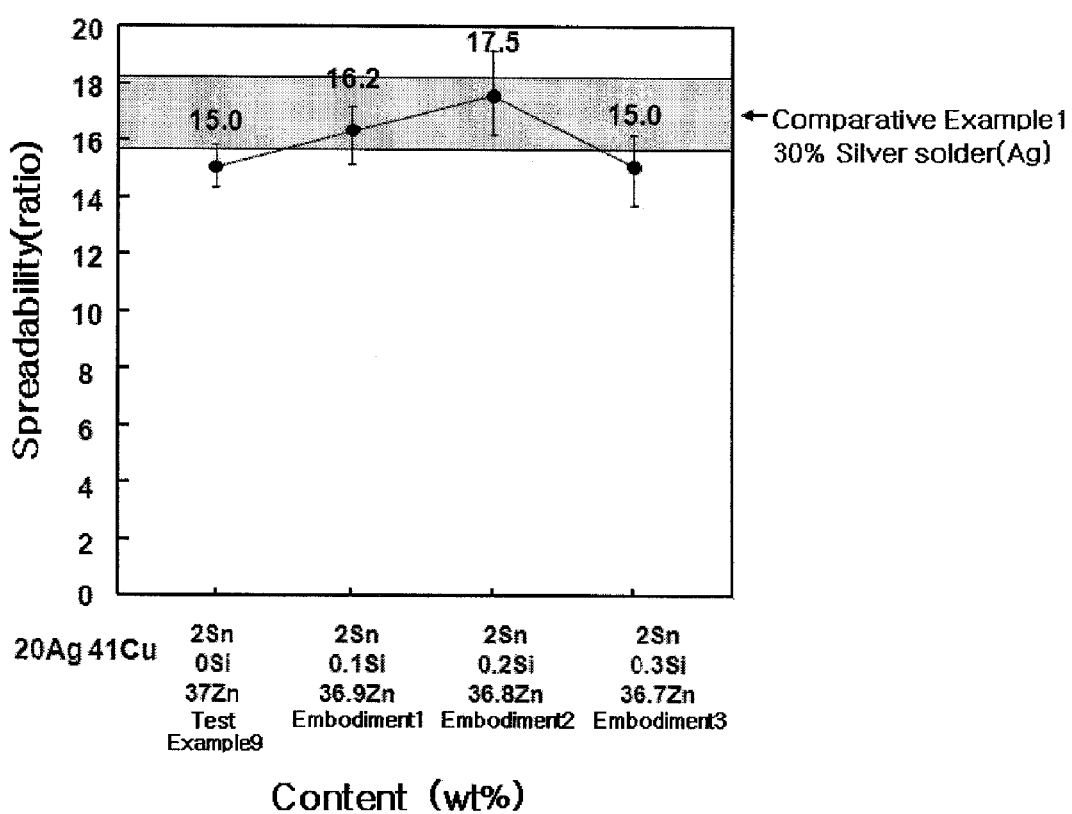
FIG. 7 is a graph showing a test example of a Ag—Cu—Zn based filler metal alloy composition for a coolant circulating pipe in accordance with first to third embodiments of the present invention, in which spreadability of the composition at different Si contents is measured.

FIG. 7 is a graph showing a test example of a Ag—Cu—Zn based filler metal alloy composition for a coolant circulating pipe in accordance with first to third embodiments of the present invention, in which spreadability of the composition at different Si contents is measured.

ing pipe brazing in accordance with the present invention has a remarkably smaller hardness value than the conventional filler metal alloy composition (Comparative Example 1) including 30 wt % Ag.

Further, similar to Embodiment 1, it will be appreciated that the filler metal alloy composition (Embodiment 2) including 20 wt % Ag, 41 wt % Cu, 2 wt % Sn, 36.8 wt % Zn and 0.2 wt % Si as the Ag—Cu—Zn based filler metal alloy composition for coolant circulating pipe brazing in accordance with the present invention has a remarkably smaller hardness value than the conventional filler metal alloy composition (Comparative Example 1) including 30 wt % Ag.

Furthermore, it will be appreciated that the filler metal alloy composition (Embodiment 3) including 20 wt % Ag, 41 wt % Cu, 2 wt % Sn, 36.7 wt % Zn and 0.3 wt % Si as the Ag—Cu—Zn based filler metal alloy composition for coolant circulating pipe brazing in accordance with the present invention has a relatively smaller hardness value than the conventional filler metal alloy composition (Comparative Example 1) including 30 wt % Ag, but Embodiment 3 has a hardness value increased to the hardness value of Comparative Example 1, closer than Embodiments 1 and 2.

Finally, it will be appreciated that, while the hardness is remarkably reduced due to addition of Si, the hardness is increased after the content of Si arrives at 0.3 wt %.

Therefore, it will be appreciated that the Ag—Cu—Zn based filler metal alloy composition for coolant circulating pipe brazing in accordance with the present invention has effects due to addition of Si in that Si having a melting point of 1420° C. and a specific weight of 2.42 g/cm$^3$ can decrease the melting point and prevent vaporization of Zn.

According to description with reference to FIGS. 2 to 7, it will be appreciated that addition of Sn and Si to the filler metal alloy composition having a reduced content of Ag is needed in the Ag—Cu—Zn based filler metal alloy composition for coolant circulating pipe brazing.

TABLE 2

| Composition | | Ag (wt %) | Cu (wt %) | Zn (wt %) | Sn (wt %) | Si (wt %) |
| --- | --- | --- | --- | --- | --- | --- |
| Embodiment 1 | Ag—Cu—Zn—Sn—Si | 20 | 41 | 36.9 | 2 | 0.1 |
| Embodiment 2 | | 20 | 41 | 36.8 | 2 | 0.2 |
| Embodiment 3 | | 20 | 41 | 36.7 | 2 | 0.3 |

| Composition | | Ag (wt %) | Cu (wt %) | Zn (wt %) | In (wt %) | Note (wt %) |
| --- | --- | --- | --- | --- | --- | --- |
| C. Example* | Ag—Cu—Zn—In | 30 | 35.8 | 33 | 1.2 | 30Ag1.2In |

*Comparative Example

Table 2 shows Embodiments 1 to 3 of the Ag—Cu—Zn based filler metal alloy composition for coolant circulating pipe brazing in accordance with the present invention in which Si is added to a tertiary system of a Ag—Cu—Zn alloy and the cross-sectional view filler metal alloy composition (Comparative Example 1).

Referring to FIGS. 6 and 7 and Table 2, it will be appreciated that the filler metal alloy composition (Test Example 9) including 20 wt % Ag, 41 wt % Cu, 2 wt % Sn, and 37 wt % Zn as the Ag—Cu—Zn based filler metal alloy composition for coolant circulating pipe brazing in accordance with the present invention and the conventional filler metal alloy composition (Comparative Example 1) including 30 wt % Ag have substantially the same hardness value.

In addition, it will be appreciated that the filler metal alloy composition (Embodiment 1) including 20 wt % Ag, 41 wt % Cu, 2 wt % Sn, 36.9 wt % Zn and 0.1 wt % Si as the Ag—Cu—Zn based filler metal alloy composition for coolant circulat- Therefore, the Ag—Cu—Zn based filler metal alloy composition for coolant circulating pipe brazing in accordance with an aspect of the present invention includes Ag, Cu, Zn, Sn, Si, and other unavoidable impurities.

Here, the Ag—Cu—Zn based filler metal alloy composition for coolant circulating pipe brazing may include 20 to 24 wt % Ag, 36 to 45 wt % Cu, 29 to 37 wt % Zn, 1 to 3 wt % Sn, 0.1 to 0.4 wt % Si, and other unavoidable impurities.

Moreover, in consideration of the case that manufacture of a welding rod formed of a filler metal alloy composition is difficult due to brittleness caused by excessive addition of Zn, the Ag—Cu—Zn based filler metal alloy composition for coolant circulating pipe brazing may include 22 wt % Ag, 41 to 45 wt % Cu, 30 to 32 wt % Zn, 2 wt % Sn, 0.2 wt % Si, and other unavoidable impurities.

Meanwhile, by manufacturing the welding rod using the Ag—Cu—Zn based filler metal alloy composition for coolant circulating pipe brazing in accordance with the present invention including Ag, Cu, Zn, Sn, and Si, it is possible to remarkably reduce manufacturing cost of the welding rod in comparison with that formed of the conventional filler metal alloy composition.

Specifically, by minimizing Ag content and excluding addition of In, it is possible to reduce a unit price of the welding rod formed of the filler metal alloy composition, and thus, remarkably reduce manufacturing cost of the welding rod.

In addition, by adding Sn and Si, it is possible to decrease a melting point of the filler metal and improve fluidity, permeability, etc., thereof, and it is possible to prevent generation of vaporization of Zn, which may badly affect an operator.

Moreover, unlike the case in which a plurality of buffing operations are needed as pretreatment of the conventional filler metal alloy composition, by minimizing Ag content and adding Sn and Si, it is possible to improve appearance of the welded zone and permeability of the filler material through the minimized number of buffing operations, i.e., only one buffing operation. Therefore, it is possible to simplify the welding process and remarkably increase productivity thereof.

Figure 8:
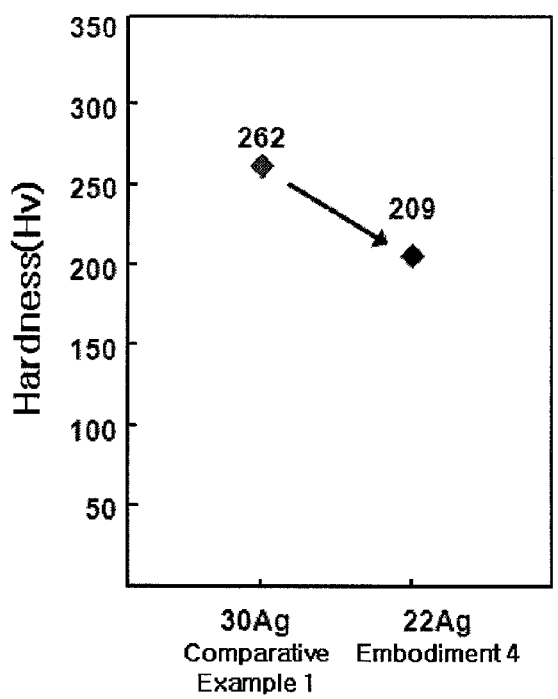
FIG. 8 is a graph showing hardness of a Ag—Cu—Zn based filler metal alloy composition for a coolant circulating pipe in accordance with a fourth embodiment of the present invention.

FIG. 8 is a graph showing hardness of a Ag—Cu—Zn based filler metal alloy composition for brazing coolant circulating pipes in accordance with a fourth embodiment of the present invention.

Figure 9:
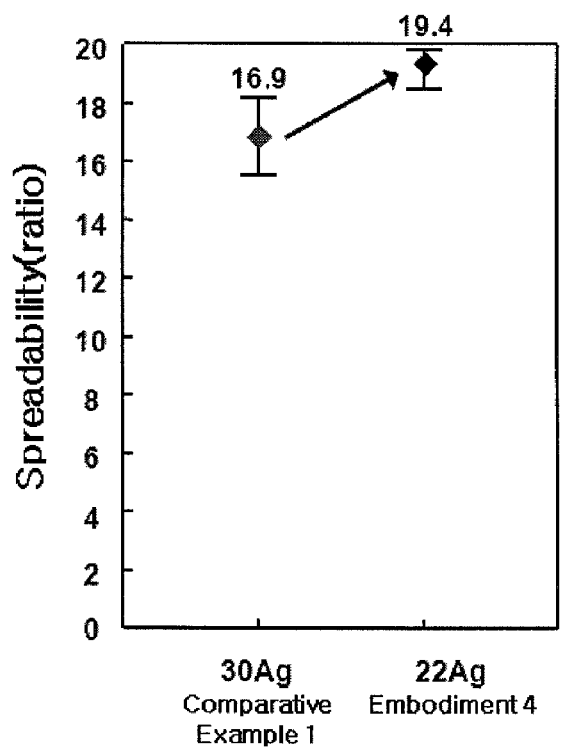
FIG. 9 is a graph showing spreadability of a Ag—Cu—Zn based filler metal alloy composition for a coolant circulating pipe in accordance with a fourth embodiment of the present invention.

FIG. 9 is a graph showing spreadability of a Ag—Cu—Zn based filler metal alloy composition for brazing coolant circulating pipes in accordance with a fourth embodiment of the present invention.

present invention has a remarkably larger spreadability value than the conventional filler metal alloy composition (Comparative Example 1) including 30 wt % Ag.

As described above, since the Ag—Cu—Zn based filler metal alloy composition for coolant circulating pipe brazing in accordance with the present invention has large spreadability, upon a welding operating by the filler metal alloy composition, the filler metal alloy composition can stably intrude into the adhesion part 115 between the straight pipe 110 and the enlarged pipe 120 in the welding zones of the coolant circulating pipes due to wettability, fluidity and permeability of the filler metal alloy composition, smoothly welding the adhesion part 115 (see FIG. 1).

As described above, the Ag—Cu—Zn based filler metal alloy composition for coolant circulating pipe brazing in accordance with the fourth embodiment of the present invention includes Zn added at 30.8 wt %, in consideration of decrease in machinability due to brittleness caused by excessive addition of Zn to the welding rod using the filler metal alloy composition having the above composition.

That is, by adjusting addition of Zn to 30.8 wt % in consideration of machinability of the welding rod to prevent machining instability due to brittleness caused by excessive addition of Zn and reducing Ag content to 22 wt %, it is possible to provide stable machinability.

Moreover, it is possible not only to obtain stable machinability by reducing Ag content to 22 wt % but also to stably manufacture the welding rod using the filler metal alloy composition having a reduced Ag content.

TABLE 3

| Composition | | Ag (wt %) | Cu (wt %) | Zn (wt %) | Sn (wt %) | Si (wt %) |
|---|---|---|---|---|---|---|
| Embodiment 4 | Ag—Cu—Zn—Sn—Si | 22 | 45 | 30.8 | 2 | 0.2 |
| Composition | | Ag (wt %) | Cu (wt %) | Zn (wt %) | In (wt %) | Note (wt %) |
| C. Example* | Ag—Cu—Zn—In | 30 | 35.8 | 33 | 1.2 | 30Ag1.2In |

*Comparative Example

Table 3 shows Embodiment 4 of the Ag—Cu—Zn based filler metal alloy composition for coolant circulating pipe brazing in accordance with the present invention in which Si is added to a tertiary system of a Ag—Cu—Zn alloy and the cross-sectional view filler metal alloy composition (Comparative Example 1).

Referring to FIG. 8 and Table 3, it will be appreciated that the filler metal alloy composition (Embodiment 4) including 22 wt % Ag, 45 wt % Cu, 37 wt % Zn, 2 wt % Sn, and 0.2 wt % Si as the Ag—Cu—Zn based filler metal alloy composition for coolant circulating pipe brazing in accordance with the present invention has a remarkably smaller hardness value than the conventional filler metal alloy composition (Comparative Example 1) including 30 wt % Ag.

As described above, since the filler metal alloy composition (Embodiment 4) including 22 wt % Ag, 45 wt % Cu, 37 wt % Zn, 2 wt % Sn, and 0.2 wt % Si shows a hardness value of lower 200 s, machinability of the welding rod may be increased using the filler metal alloy composition (Embodiment 4).

Referring to FIG. 9 and Table 3, it will be appreciated that the filler metal alloy composition (Embodiment 4) including 22 wt % Ag, 45 wt % Cu, 37 wt % Zn, 2 wt % Sn, and 0.2 wt % Si as the Ag—Cu—Zn based filler metal alloy composition for coolant circulating pipe brazing in accordance with the As described above, unlike the conventional filler metal alloy composition having 30 wt % Ag or more, even when Ag content is minimized to 22 wt %, it is possible to stably manufacture the welding rod using the filler metal alloy composition into which Sn and Si are added.

In addition, by minimizing the Ag content to 22 wt %, it is possible to reduce a unit price of the welding rod formed of the filler metal alloy composition into which Sn and Si are added, thereby remarkably reducing manufacturing cost thereof.

As described above, the filler metal alloy composition in accordance with the present invention described with reference to FIGS. 2 to 9 includes other unavoidable impurities, which may be selectively included within a range of 0.01 wt % to 0.1 wt %.

Meanwhile, appearance and cross-section of a welded zone of the coolant circulating pipes welded by the welding rod formed of the Ag—Cu—Zn based filler metal alloy composition for coolant circulating pipe brazing in accordance with the fourth embodiment of the present invention described with reference to FIGS. 8 and 9 and Table 3 will be described below with reference to FIGS. 10A to 11B.

Figure 10A:
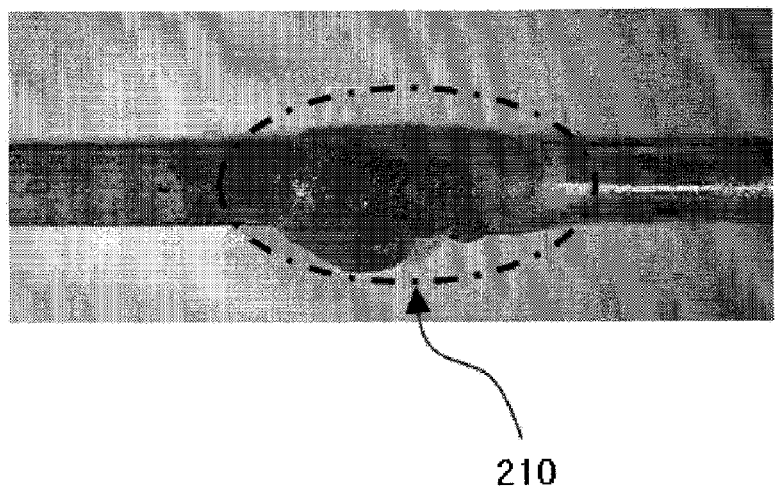
FIG. 10A is a photograph showing appearance of a welded zone when coolant circulating pipes formed of a conventional filler metal alloy composition including 30 wt % Ag are welded.
Figure 10B:
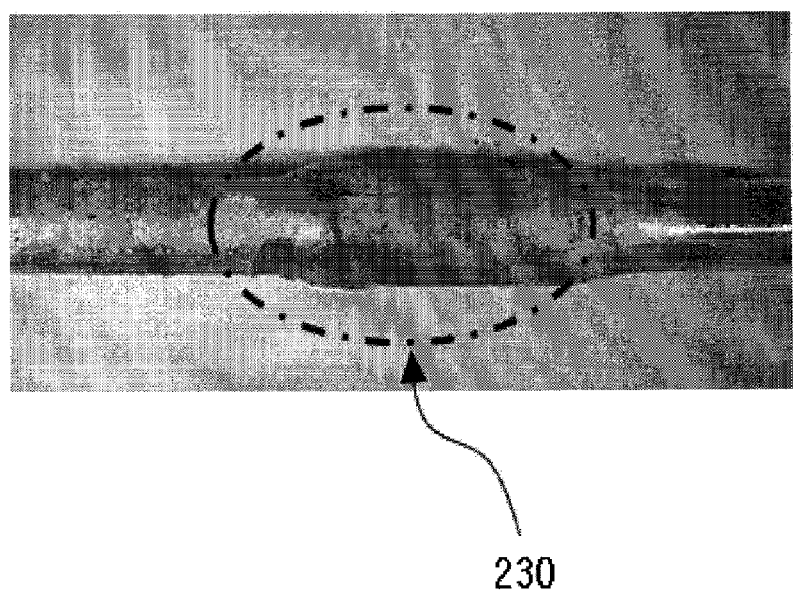
FIG. 10B is a photograph showing appearance of a welded zone when coolant circulating pipes formed of a filler metal alloy composition including 22 wt % Ag in accordance with the present invention are welded.

FIG. 10A is a photograph showing appearance of a welded zone when coolant circulating pipes formed of a conventional filler metal alloy composition including 30 wt % Ag are welded, and FIG. 10B is a photograph showing appearance of a welded zone when coolant circulating pipes formed of a filler metal alloy composition including 22 wt % Ag in accordance with the present invention are welded.

Figure 11A:
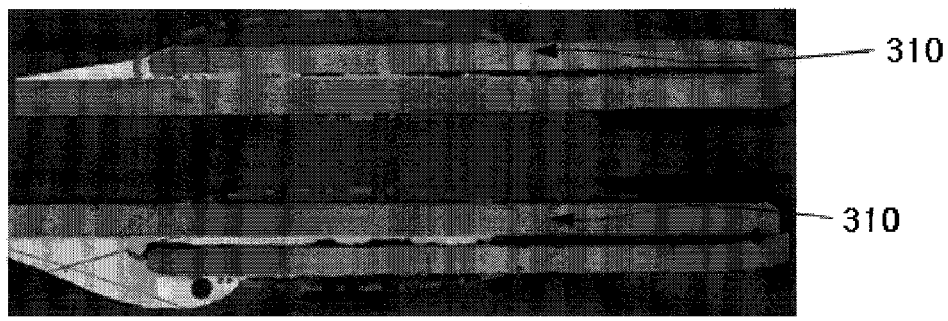
FIG. 11A is a photograph showing a cross-section of a welded zone when coolant circulating pipes formed of a conventional filler metal alloy composition including 30 wt % Ag are welded.
Figure 11B:
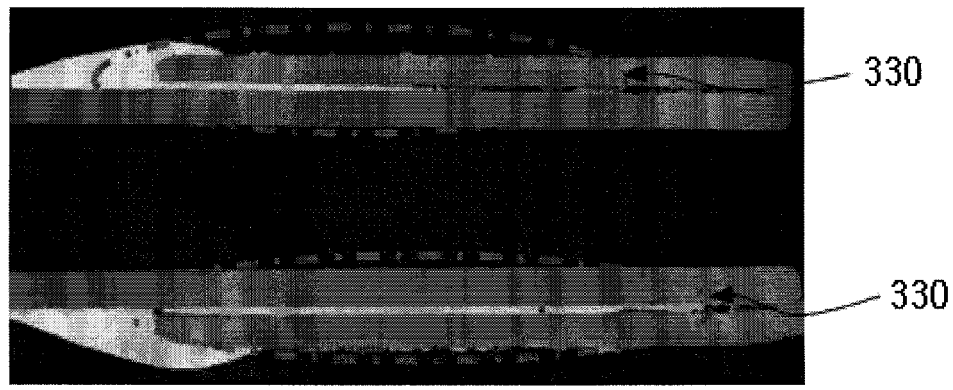
FIG. 11B is a photograph showing a cross-section of a welded zone when coolant circulating pipes formed of a filler metal alloy composition including 22 wt % Ag in accordance with the present invention are welded.

FIG. 11A is a photograph showing a cross-section of a welded zone when coolant circulating pipes formed of a conventional filler metal alloy composition including 30 wt % Ag are welded, and FIG. 11B is a photograph showing a cross-section of a welded zone when coolant circulating pipes formed of a filler metal alloy composition including 22 wt % Ag in accordance with the present invention are welded.

As shown in FIGS. 10B and 11B, it will be appreciated that the welded zone, in which the welding rod formed of the Ag—Cu—Zn based filler metal alloy composition for coolant circulating pipe brazing in accordance with the present invention is applied to weld the coolant circulating pipes, has good appearance of a welded zone 230 and good permeation into a cross-section permeation region 330.

Specifically, after the welding operation using the solder formed of the Ag—Cu—Zn based filler metal alloy composition for coolant circulating pipe brazing in accordance with the present invention in which only one buffing operation is performed as a pretreatment process of the welding operation, appearance of the welded zone 230 and permeation of the cross-section permeation region 330 are improved. In particular, as shown in FIG. 11B, the cross-section permeation region 330 shows good cross-section permeation of the filler metal alloy composition.

On the other hand, referring to FIGS. 10A and 11A, after the welding operation using the welding rod formed of the conventional filler metal alloy composition for coolant circulating pipe brazing, the welded zone 230 has poor appearance and the cross-section permeation region 330 also show poor cross-section permeation.

As described with reference to FIGS. 10A to 11B, unlike the conventional filler metal alloy composition for coolant circulating pipe brazing, the welding rod formed of the Ag—Cu—Zn based filler metal alloy composition for coolant circulating pipe brazing in accordance with the present invention can improve appearance of the welded zone and cross-section permeation of the filler metal alloy composition by minimizing Ag content and adding Sn and Si, even when the number of buffing operations is minimized, i.e., even when only one buffing operation is performed.

Moreover, unlike the conventional pretreatment operation of welding in which a plurality of buffing operations are performed to obtain perfect buffing, since the appearance of the welded zone and the cross-section permeation of the filler metal alloy composition can be improved by only one buffing operation, it is possible to simplify the welding process to remarkably increase operation efficiency. Effects of the filler metal alloy composition in accordance with the present invention will be described as follows.

First, by minimizing Ag content and excluding In, it is possible to reduce a unit price of the welding rod formed of the filler metal alloy composition, and thus, remarkably reduce manufacturing cost of the welding rod.

Second, by adding Sn and Si, it is possible to lower a melting point and improve fluidity, permeability, etc., of the filler metal, and it is possible to prevent vaporization of Zn, which may badly affect an operator.

Third, by minimizing Ag content and adding Sn and Si, the appearance of the welded zone and the cross-section permeation of the filler metal alloy composition can be improved by the minimized number of buffing operations, i.e., only one buffing operation, and the welding process can be simplified to remarkably increase operation efficiency.

Although the exemplary embodiments of the present invention have been disclosed for illustrative purposes, those skilled in the art will appreciate that various modifications, additions and substitutions are possible, without departing from the scope and spirit of the present invention as disclosed in the accompanying claims.

What is claimed is:

1. A filler metal alloy composition brazed to a joint between parent metals to stably join the parent metals formed of the same material or different materials, characterized in that the composition comprises silver (Ag), copper (Cu), zinc (Zn), tin (Sn), silicon (Si), and other unavoidable impurities, wherein the filler metal alloy composition comprises 20 to 24 wt % Ag, 36 to 45 wt % Cu, 29 to 37 wt % Zn, 1 to 3 wt % Sn, 0.1 to 0.4 wt % Si, and other unavoidable impurities.

2. The filler metal alloy composition according to claim 1, wherein the filler metal alloy composition comprises 22 wt % Ag, 41 to 45 wt % Cu, 30 to 32 wt % Zn, 2 wt % Sn, 0.2 wt % Si, and other unavoidable impurities.

* * * * *